(12) United States Patent
Pipa (10) Patent No.: US 6,231,185 B1
(45) Date of Patent: May 15, 2001

(54) PROCESS AND DEVICE FOR DETECTING A REFLECTING SURFACE OF A HUMAN BEING

(75) Inventor: Gordon Pipa, Dinslaken (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/462,585

(22) PCT Filed: Jul. 9, 1997

(86) PCT No.: PCT/DE97/01454

§ 371 Date: Mar. 31, 2000

§ 102(e) Date: Mar. 31, 2000

(87) PCT Pub. No.: WO99/03066

PCT Pub. Date: Jan. 21, 1999

(51) Int. Cl.$^7$ .................................................. A61B 3/14
(52) U.S. Cl. ............................................................. 351/208
(58) Field of Search ................................. 351/208, 210, 351/209, 211, 212, 221, 246; 382/117, 115, 128

(56) References Cited

U.S. PATENT DOCUMENTS

| 4,950,069 | 8/1990 | Hutchinson . | |
|---|---|---|---|
| 5,471,542 | * 11/1995 | Ragland | 382/128 |
| 5,966,197 | * 10/1999 | Yee | 351/210 |

FOREIGN PATENT DOCUMENTS

| 27 40 998 A1 | 3/1979 | (DE) . |
| 195 41 301 C1 | 6/1997 | (DE) . |

OTHER PUBLICATIONS

Y. Ebisawa, "Unconstrained pupil detection technique using two light sources and the image difference method", Visualization and intelligent design in Engineering and Architecture II, Proc. of $2^{nd}$ International Conference on visualization tools, Spain, Jul. 1995, Southampton UK, Comput. Mech., Publications, UK pp. 79–89.

Y. Ebisawa et al, "Non–invasive eye–gaze position detecting method use and man/machine interface for the disabled", Computer–based medical systems, Proc. of the $4^{th}$ IEEE Symposium, Baltimore May 1991, IEEE Comput. Soc. Press, USA, pp. 374–380.

T.E. Hutchinson et al, Human–Computer Interaction using eye–gaze input, IEEE, vol. 19, No. 6, Nov./Dec. 1989, pp. 1527–1534.

DE Bild der Wissenschaft, p. 27, 1977, 3, "Blick ins Auge", entw. v. Wissenschaftler des Radiation Center von Honeywell, (Lexington/USA).

* cited by examiner

Primary Examiner—George Manuel
(74) Attorney, Agent, or Firm—Schiff Hardin & Waite (57) ABSTRACT

According to the invention, first and second image signals of at least the characteristic region are generated with a camera, whereby the first image signals are generated with a first and the second image signals are generated with the first and an additional, second light source having a light emission different from the first. The first and second image signals are subtracted and difference image signals are generated. These difference image signals are investigated in view of the signals generated from the characteristic region, and the location coordinates of the characteristic region are identified, and a corresponding signal is generated.

15 Claims, 5 Drawing Sheets

PROCESS AND DEVICE FOR DETECTING A REFLECTING SURFACE OF A HUMAN BEING

BACKGROUND OF THE INVENTION

1. Field of the Invention

The invention relates to a method for operating an apparatus for acquiring the location of at least one characteristic area of a person and for generating a control signal for a device dependent on this location.

2. Description of the Related Art

German Patent DE 27 40 908 discloses an x-ray diagnostics means for transillumination and provides a means for acquiring the viewing direction of an observer. The means is connected to a control device for varying the direction of the central ray of a ray beam emanating from an x-ray source, so that the direction of the central ray can be modified dependent on the viewing direction of the observer.

The periodical Bild der Wissenschaft, Nr. 3, 1977, page 27, published a report under the title "Blick ins Auge" according to which scientists of the Radiation Center of Honeywell (Lexington/USA) have developed a device that makes it possible to acquire, to register and to visualize the viewing direction of a test person as preciseley as possible. An infrared light beam is directed onto the eyes of the test person and a special video camera registers each eye movement. The information identified in this way are supplied to a mini-computer that calculates the respective position of where the person is looking and allows this to appear on a picture screen as a visible point. The scene observed by the test person can be seen on the same picture screen. The "remote oculometer" allows the direction of view to be acquired without deteriorating normal eye movements. This system is used in the USA in the Air Force, the Marines, in NASA and in commercial air traffic. It serves both training purposes, namely improving the ability of the observer to concentrate, as well as design purposes for determining better designs of cockpits, instrument panels and similar devices. Further areas of application are opened up in reviewing the effectiveness of advertising in television programs, in the registration of recognition possibilities in road traffic and in determining learning disabilities in children.

German Patent DE 195 41 301 provides a controlling means for acquiring what an observer has focused on and observed on a display means observed, whereby the means controlling generate a signal for controlling the display means such that the resolution of the display means in the observed area is higher than in the non-observed area of the display means.

In such devices for acquiring the viewing direction or what an observer has focused on, it is mainly the eyes of the person that are utilized, and the direction of view is acquired on the basis of the alignment of the pupil in the eye. The image signals of the eye registered by a camera are interpreted by an image computer and converted into control signals. However, since the recognition of the pupil from the image signals of a camera, is an extremely complicated procedure, a high calculating performance of the computer unit is required. Such computer units are expensive since they must work with large data sets generated from the image signals in an optimally short time. The required computing power is significantly greater than available in current PCs. The application of such a means is therefore limited to few areas of employment.

A device for detecting the pupil movement for controlling, in particular, a computer on the basis of a menu is previously known from Ebisawa, Y., "Unconstrained Pupil Detection Technique using Two Light Sources and the Image Difference Method", Visualization and Intelligent Design in Engineering and Architecture II, Proceedings of 2nd International Conference on Visualization Tools for Intelligent Design in Engineering and Architecture, La Coruna, Spain, June 1995, ISBN 1-85312-319-5, 1995, Southhampton, UK, Comput. Mech. Publications, UK, pages 79–89, XP002052717. The apparatus in this referance uses two light sources that are implemented as infrared light sources and are arranged at an angle relative to one another, as well as a video camera in combination with a computer unit that subtracts the image signals of the light sources driven in alternation from one another in order to generate difference image signals. This apparatus differs from the subject matter of the present application in that the light sources according to the reference have the same light emission. The subject matter of the present application is therefore not known from the reference, nor is there an obvious teaching thereof.

Using only a single infrared light source for generating image signals for detecting eye movement is known from Ebisawa, Y. et al., "Non-invasive Eye-gaze Position Detecting Method Used on Man/Machine Interface for the Disabled", Computer based Medical Systems, Proceedings of the Fourth Annual IEEE Symposium, Baltimore, Md. USA, May 12–14 1991, ISBN 0-8186-2164-8, 1991, Los Alamitos, Calif., USA, IEEE Comput. Soc. Press, USA, pages 374–380, XP000350289, Section "2.2.2 Camera Rotation system".

U.S. Pat. No. 4,950,069 discloses a device for detecting the eye movement and for generating a control signal for a computer. In combination with only a single infrared light source, an infrared camera generates image signals that are processed in a computer for generating the control signals.

SUMMARY OF THE INVENTION

It is therefore an object of the invention to specify a method and an apparatus of the species initially cited with which it is possible to manage with lower computing power and, thus, lower costs.

This object is inventively achieved by a method for operating a device for acquiring the location of a characteristic region of a person and generating a control signal for a device dependent on this location which comprises the steps of generating first and second image signals of a characteristic region with a camera, and two light sources (one with an emission different from the other), subtracting one image signal from the other, analyzing the difference signal thus produced, determining location coordinates of the characteristic region, and generating a signal dependent on these location coordinates.

This object is also inventively achieved by an apparatus for acquiring the location of a characteristic region of a person and for generating a control signal for a device dependent on this location having an image signal generator for generating first and second image signals of the characteristic region with a camera, two light sources with a second having a light emission different from the first, a subtractor which calculates a difference image signal from the two image signals, an analyzer and locator for determining the location coordinates of the characteristic region, and a location coordinate generator for generating a signal dependent on the location coordinates. 18.

An advantage of the method is that, in a first process, (method step (a)) the method steps generate first and second image signals of the characteristic area with a camera, whereby the first image signals are generated with a first light source and the second image signals are generated with the first and an additional, second light source having narrow-band light emission. The first and second image signals consequently differ from one another particularly due to the influence of the second light source in a method step (b). When the first and second image signals are subtracted for generating difference image signals, then the difference image signals contain only the information that are generated by the second light source. The influences of the first light source on the image signals as well as reflections from the environment of the person are thus eliminated to the farthest-reaching extent. When the difference signals are analyzed in view of the signals generated by the characteristic area and the location coordinates of the characteristic area are identified, then a control signal dependent on the location coordinates can be generated and a device can be operated or controlled. To be cited as a particular advantage of this method is that, in particular, method steps (a) and (b) can be implemented in a programmable logic device for which no calculating capacity of the computer unit is thus required. The calculating capacity is limited merely to the evaluation of the difference signals in view of the identification of the location of the image signals generated by the characteristic area. The computing power and, thus, the costs for the computer system can therefore be substantially reduced.

For a further reduction of the computing power, it is advantageous when, in method step a), only predetermined lines of the camera are read out. In particular, it can suffice when only every second or third line is read out, resulting in a reduction in the quantity of data based on the image signals to one-half or, respectively, one-third.

A further reduction in the amount of data to be processed derives when, in a second process following the first, the method steps (a) and (b) are repeated and when, in a method step (c), the examination of the difference signals is limited to a predetermined area that is dependent on the location coordinates of the characteristic area or region. It has been shown, namely, that a characteristic area can only traverse a specific distance in a predetermined time. When the readout of the image signals of the camera is limited to the maximally traversable distance of the characteristic area, then only the image signals of the camera from this predetermined area need be interpreted in order to identify the current location coordinates of the new location of the characteristic area.

If it should be determined, however, that no signals emanating from the characteristic area in the area predetermined in this way can be identified, then the predetermined area can be advantageously enlarged in a further method step.

It is advantageous when the second process is continuously repeated, since, due to the mere evaluation of the image signals of the predetermined area compared to all image signals derivable from the camera, the amount of data to be processed is reduced, requiring less computing capacity.

It is of particularly great advantage for further data reduction when the difference image signals are differentiated pixel-by-pixel and the differentiation data thus obtained are analized to see which data upwardly or downwardly exceed a predetermined limit, and whereby the location coordinates are only determined from the data that upwardly or downwardly exceed the limit.

It is advantageous when only the addresses of the differentiation data that upwardly or downwardly exceed the limit are stored in an address memory, and when the computer unit identifies the location coordinates on the basis of the data stored in the address memory. The amount of data to be processed is thereby considerably reduced, i.e., limited only to the data that upwardly or downwardly exceed the limit.

It is also advantageous when the differentiation data are stored as a histogram in a histogram memory, and when the computer unit calculates the location coordinates on the basis of the data stored in the address and histogram memory. The limit can thus be calculated on the basis of the data stored in the histogram memory.

The employment of a light emanating from the second light source, invisible to the person is especially advantageous, and it is particularly advantageous when this invisible light is infrared light. The ambient light can thus be employed as first light source; moreover, the light of the second light source does not disturb the person since the person cannot see it.

It is particularly advantageous for detecting the viewing direction of the person when the characteristic area of the eye is the pupil of the eye.

When the characteristic area is a reflective surface that is connected to the person, then, for example, the movement of the head, the hands, the arm or some other body part of the person can be utilized for operating the device.

An apparatus for the implementation of the method, as described above, and also possibly including data stores for storing first, second, and difference image data, a computer unit for calculating the location coordinates of the characteristic region from the difference image signals, a unit for data reduction, a threshold unit for comparing differentiation data to a predetermined limit, an address memory for storing the address of differentiation data the exceeds predetermined limit boundaries, a histogram calculator and memory, and a programmable logic device encompassing the image subtractor and/or the data reduction unit, is structurally simple and can be cost-beneficially realized.

BRIEF DESCRIPTION OF THE DRAWINGS

Further advantages and details of the invention derive from the following description of an exemplary embodiment with reference to the drawings in combination with the description below.

DESCRIPTION OF THE PREFERRED EMBODIMENTS

Figure 1:
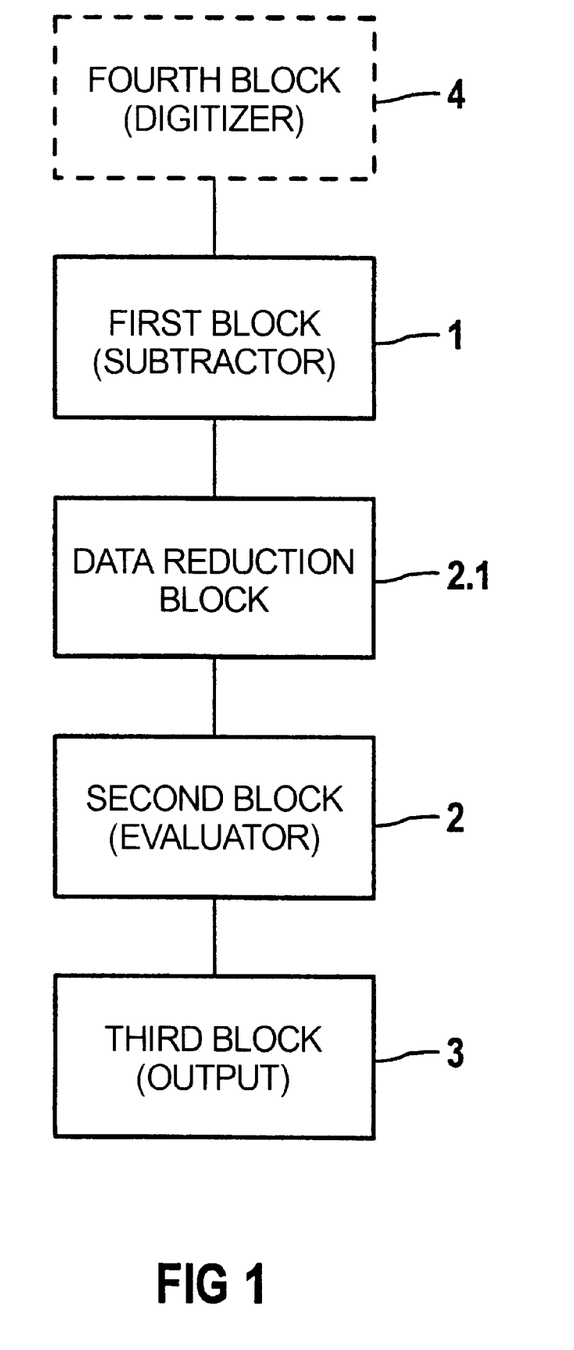
FIG. 1 a block is circuit diagram of a method and an apparatus of the invention.

In the first Block (substractor) 1 of the block circuit diagram shown in FIG. 1, the first image signals derivable from a camera and generated with a first light source are subtracted from second image signals that were generated with the first light source and with an additional, second light source different from the first. The first and second image signals as well as the difference image signals can be respectively stored in a memory or in a shared memory. In a second Block (evaluator) 2 following the first, the evaluation of the difference signals ensues in a further method step in view of determining the location of the image signals generated by the characteristic area and of determining the location coordinates of the characteristic area, as well as generating a control signal for the device dependent on the location coordinates. In a further method step, the output of the location coordinates or, respectively, of the control signal to the device can ensue, this being a further method step that can be implemented in a third Block (output) 3.

When, for example, as a video camera, the camera generates analog image signals, then a fourth Block (digitizer) 4 precedes the first Block 1, which digitizes the image signals of the camera. This fourth Block 4 can be foregone when a camera is employed that generates digital image signals. The method steps indicated in FIG. 1 or, respectively, the Blocks 1 through 4 indicated therein can preferably implement their jobs independently of one another, i.e., work in parallel, resulting in a higher data processing speed.

It is especially advantageous when a data reduction Block 2.1 precedes the second Block 2, which undertakes a differentiation of the difference image signals proceeding from the Block 1. In the differentiation, successive pixels of the image signals (difference image signals) are subtracted from one another, so that the contrast between these pixels is identified. A histogram of the differentiation data can preferably be formed during the differentiation, and the frequency with which specific contrasts are contained in the image signals can be identified. By defining a threshold, the determination of the location of the image signals generated by the characteristic area can be undertaken in the following, second block without great calculating effort, and the location coordinates can be identified.

Figure 2:
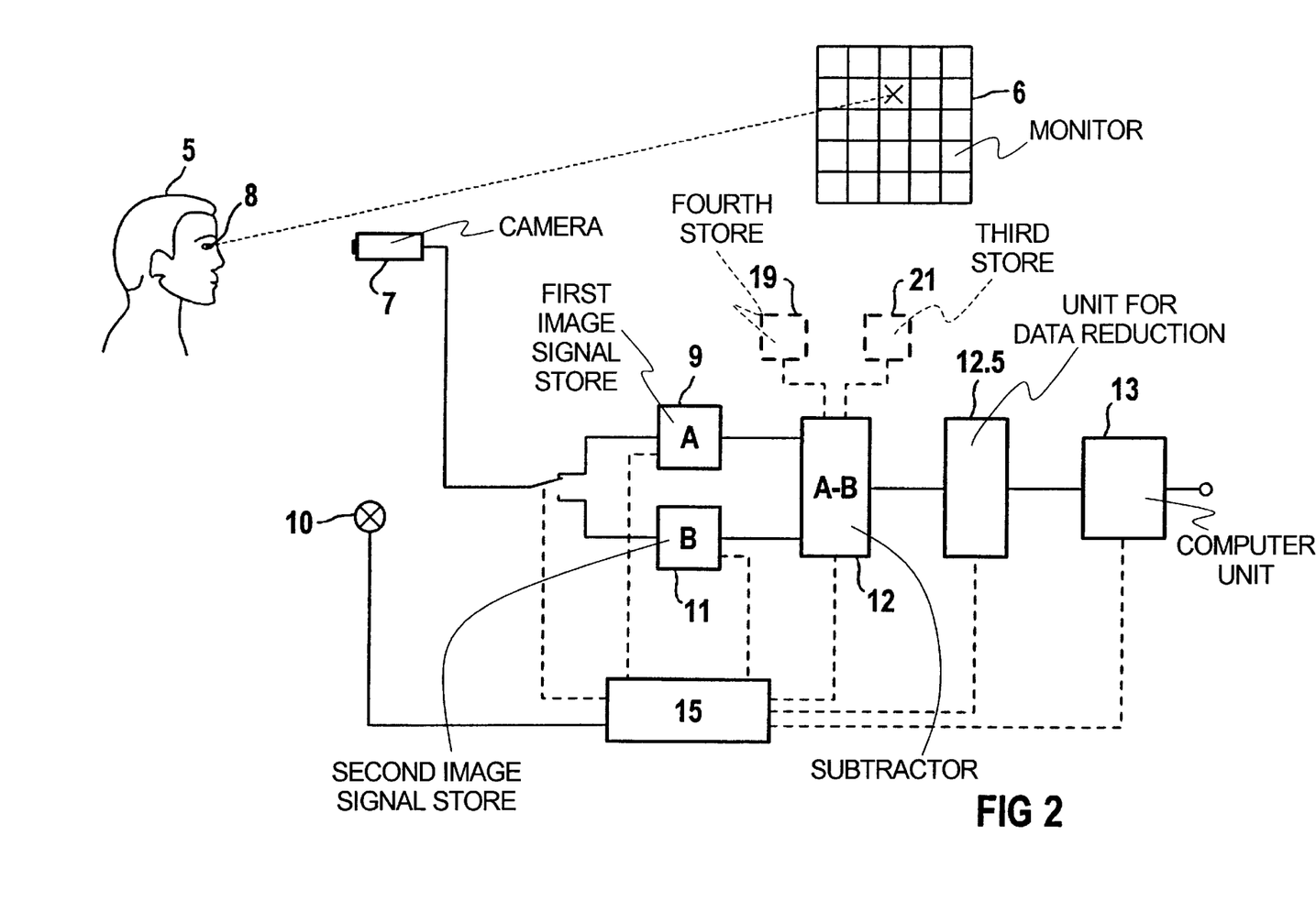
FIG. 2 a block is circuit diagram of the apparatus of FIG. 1.
Figure 5:
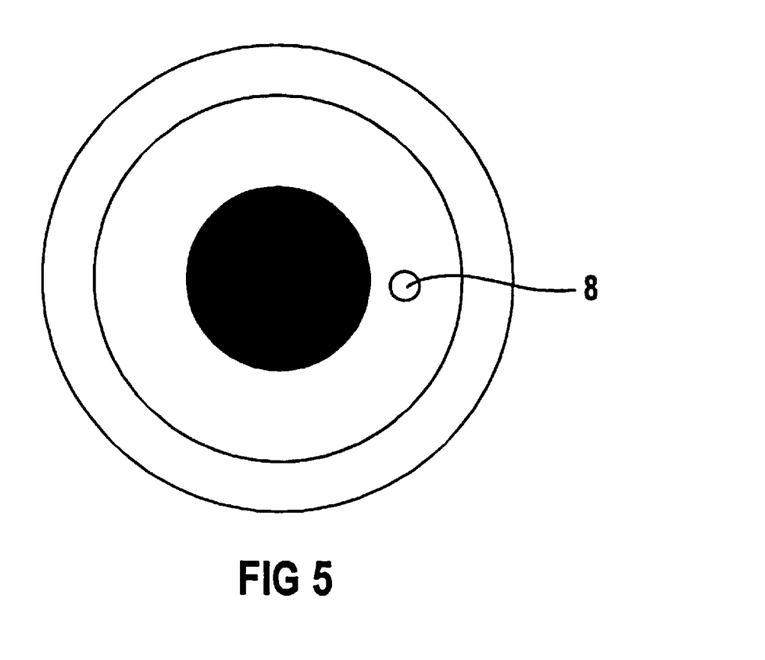
FIG. 5 a contact lens applied onto an eye and having a characteristic area.

FIG. 2, schematically shows an apparatus for the implementation of the method of the invention, whereby a person 5 looks, onto a display such as a monitor 6, on which, for example, operating fields for a device, for example for a medical device or for a computer, are arranged or displayed. The direction of view and, thus, the object on which the person 5 has focused on the monitor 6, is acquired by a camera or other device 7, in that the image signals of the location of a characteristic area 8, for example of the pupil of the eye, of a reflector arranged at the head or at a body part of the person 5 or a reflector arranged on a contact lens (FIG. 5) are calculated from the image signals derivable from the camera 7 in view of the location of the detector service of the camera 7 from which they emanate. The reflector is thereby preferably implemented such that it reflects the light emanating from the second light source 10 especially well. This reflector, however, can also be implemented as an absorber that then highly absorbs the light of the second light source 10. Inventively, first image signals are generated with the light of a first light source that, for example, emits visible light and are supplied to a first image signal store 9. Subsequently, second image signals are generated with the light of the first light source and of an additional, second light source 10 and are supplied to a second image signal store 11. The second light source 10 preferably generates a light having a wavelength that the person 5 cannot perceive. Such as, ideally, an infrared light source is suited therefor, this particularly preferably generating light having a wavelength in the range, between 900 and 1000 nm. An infrared semiconductor diode may be thus suited as second light source. The employment of infrared light having a wavelength of 950 nm is beneficial since the light emitted by the sun has a minimum intensity in this range. An infrared filter that allows an extremely narrow-band light of the wavelength of 950 m to pass is also preferably arranged in front of the camera 7. Image signals of the camera 7 that are based on the visible light are thus stored in the first image signal store 9. Inage signals that are based on the visible light and on the light of the second light source 10 are stored in the second image signal store 11.

This has an advantageous effect in the following method step when the image signals obtained in the image signal stores 9, 11 are supplied to a subtractor 12 that subtracts the first and second image signals from one another. The stores 9, 11 and, in particular, the subtractor 12, can thereby advantageously be parts of programmable logic. As a result difference image signals are generated that are essentially based on the light of the second light source 10, essentially eliminating the reflections and noise influences proceeding from the visible light.

The subtractor 12 is followed by a unit for data reduction 12.5 that, according to the data reduction block 2.1 of FIG. 1, implements the pixel-by-pixel differentiation and generation of a histogram.

A computer unit 13 calculates the location of the image signals that emanate from the characteristic region 8 from the differentiation data generated by the unit for a data reduction 12.5. The differentiation data are thus evaluated in view of a specific signal height that they exceed or, respectively, fall below. The image signals (data) emanating from the characteristic region 8 can exhibit either especially high or especially low values and/or values determined in a specific region, i.e., optimally clearly, i.e., characteristically, differ from the other image signals, which can be utilized as evaluation criterion. On the basis of these differentiation data, the computer unit 13 preferably calculates the location coordinates of the center of these image signals generated by the characteristic region 8. When a control signal is generated dependent on the location coordinates, the control signal can be utilized for the operation of a device. For example, the control signal can serve the purpose of controlling a computer, an apparatus or a device. When these are implemented with a display, then the cursor can be adjusted on the display via the control signal in conformity with the direction of view or with the location of the characteristic area 8, and, thus, the computer, the apparatus or the device can be controlled. When the direction of view or the characteristic region 8 dwells for some definable time, then one can perform a function such as implementing a menu function that is being looked at. A further possibility of implementing the menu function being looked at is comprised in the "interpretation" of conscious lid blinking, which clearly differs in duration from unconscious lid blinking. An operation of the computer, of the apparatus or of the device can thus ensue without additional effort, such as having to use the hands for this purpose. Further, it is also possible to operate a medical-technical device when an operating menu required for the operation of the medical-technical device appears on a display.

The time control of the readout of 1) the image signals of the camera 7, 2) the second light source 10, 3) the storing and readout of the image signals of the camera 7 into or out of the first or, respectively, second image signal store 9 or, respectively, 11, the control of the subtractor 12 of the unit for data reduction 12.5 4) and of the computer unit 13, ensue via a controller 15 that is shown in FIG. 2.

Figure 3:
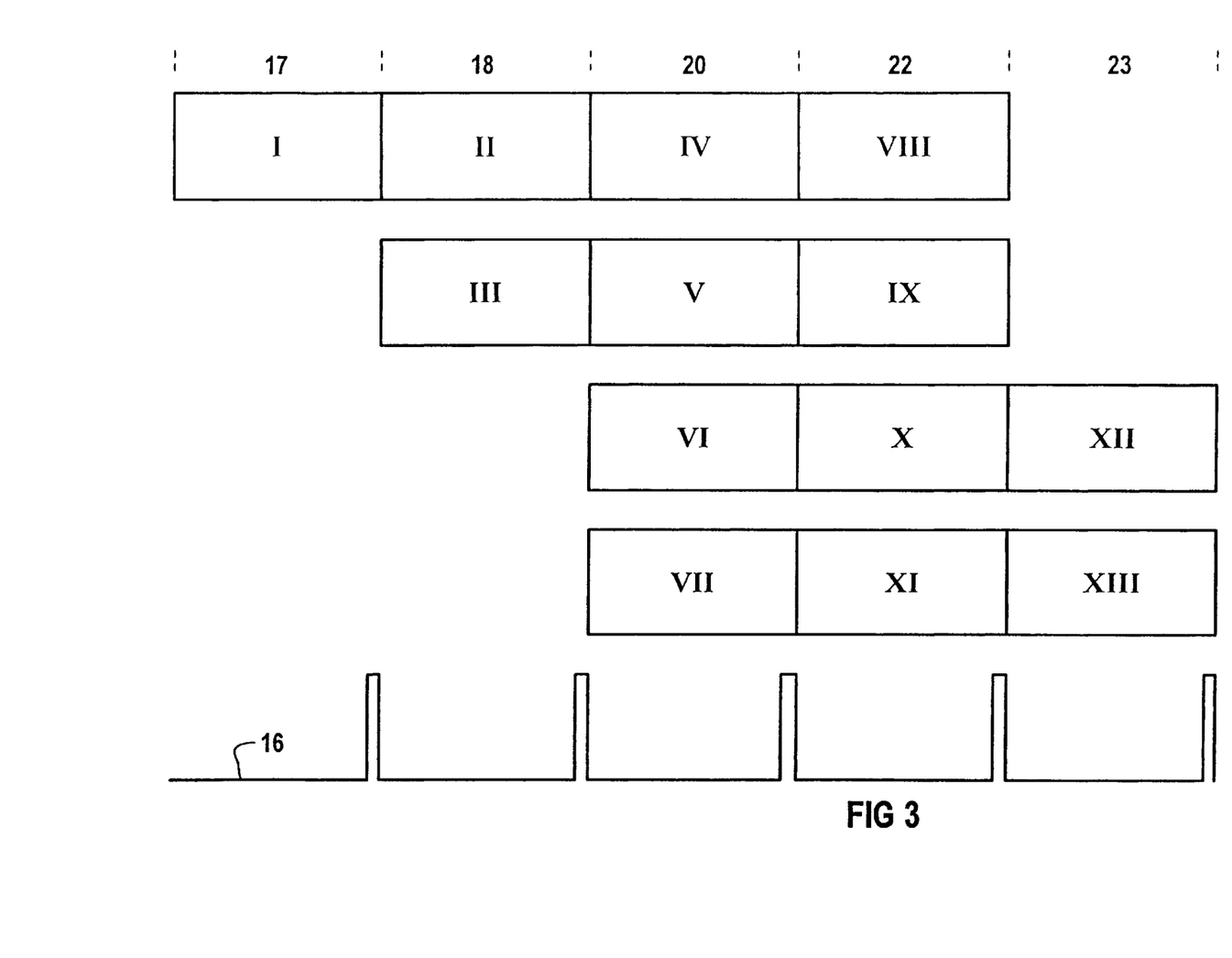
FIG. 3 is a timing diagram for the implementation of the method steps.

FIG. 3 shows a timing diagram, in which, dependent on the image synchronous pulses 16 in a first cycle 17, the image signals derivable from the camera 7 are digitalized, when a video camera that generates analog signals is employed, and that these first image signals are stored (I) in the first image signal store 9. In a second cycle 18, the second image signals are potentially digitalized and transferred (II) into the second image signal store 11. Further, the image signals stored in the first and second image signal store 9, 11 are subtracted from one another and are possibly stored in a fourth store 19 (FIG. 2), which the computer unit 13 can access (III). In a third cycle 20, current, first image signals are potentially digitalized and written (IV) into the first image store 9. Further, the image signals of the first and second image signal store 9, 11 are subtracted from one another and transferred, by way of example but not necessarily, into a third store 21 (FIG. 2) that the computer unit 13 can likewise access (V). In the third cycle 20, further, the difference signals stored in the fourth store 19 are interpreted in view of the location of the characteristic region 8 (VI), location coordinates corresponding to this location are calculated, and a corresponding control signal is generated (VII). In a fourth cycle 22, current, second image signals are potentially digitalized and transferred (VIII) into the second image signal store 11, the image signals of the image signal stores 9, 11 are subtracted and transferred into the fourth store 19 (IX). Further, the difference image signals stored in the third store 21 are differentiated pixel-by-pixel and the differentiation data thus obtained and corresponding to the difference between the pixels are evaluated (X) in view of the location of the characteristic region 8. Location coordinates corresponding to this location are calculated and a corresponding control signal is generated (XI). In a fifth cycle 23, the difference image signals—as explained above—stored in the fourth store 19, are interpreted (XII) in view of the location of the characteristic region 8, location coordinates corresponding to this location are calculated, and a corresponding control signal is generated (XIII).

It has proven advantageous in the framework of the invention where either all lines or, some fraction thereof, such as one-half or one-third of the camera 7 are read out only during a first process—as explained above—in order to identify the location of the characteristic region 8.

Figure 4:
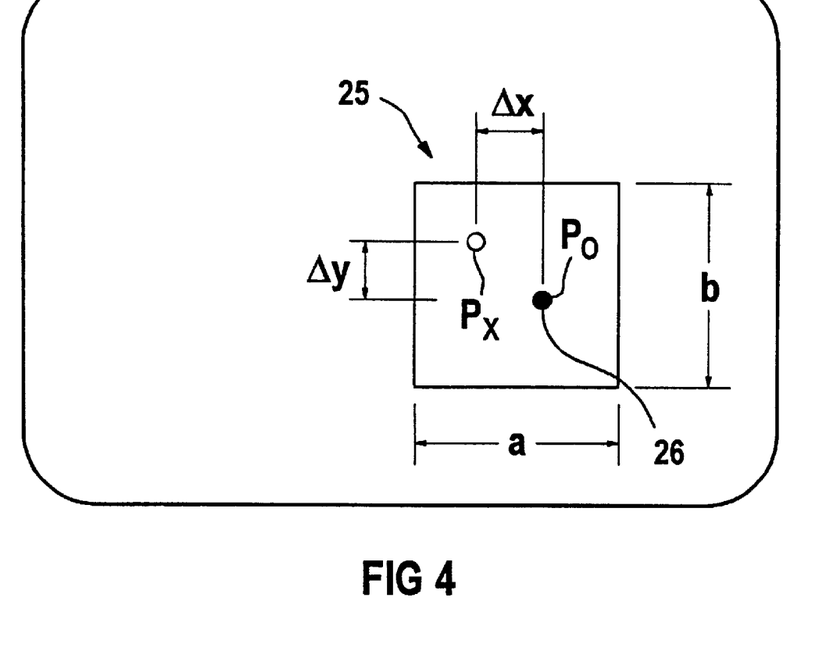
FIG. 4 a predetermined area having the current and previous location coordinates of a characteristic area.

To further reducing the amount of data to be processed, however, it is advantageous when, following the first acquisition of the location, a second process is continuously implemented in which the method steps of storing the first and second image signals and subtracting the first and second image signals are implemented for generating difference image signals, and the evaluation of the difference image signals is limited to a predetermined region 25 (FIG. 4) that is dependent on the location coordinates of the characteristic region 8 identified in the preceding process. When the characteristic region 8 is the pupil of an eye of the person 5, then the pupil can traverse only a specific distance $\Delta x$, $\Delta y$ in a predetermined time t. I.e., proceeding from the first identified location coordinates $P_o$, the further location coordinates $P_x$ of the acquired, characteristic region 8 are to be anticipated within a predetermined area on the image converter of the camera 7. The size of this predetermined area 25 is thus dependent on the maximum speed with which, for example, the pupil can be readjusted and on the generation and readout time of the image signals of the camera 7. When the acquired location of the characteristic region 8 lies in the center of this predetermined area 25, then a circular area would actually have to be evaluated as predetermined area 25, the radius thereof deriving from the maximum displacement distance. Since, however, it requires a substantially greater calculating effort to interpret a round area compared to a quadratic or rectangular area, a quadratic area is advantageously defined for evaluation, i.e., as predetermined area 25. According to FIG. 4 $\Delta x$ and $\Delta y$ indicates the real change of the first acquired location 26 in the x-direction or, respectively, y-direction. The predetermined area has the dimensions a, b. The first acquired location 26 at the time t=0 is located in the center of the predetermined area 25; a and b derive from double the distance of the maximum location change of the pupil of the eye between the time t=0 and t=X. $\Delta x$ and $\Delta y$ are thus always lower than a and b. The following algorithm is implemented for the definition of the coordinates of the predetermined area:

$Z_o$=line of the point at the time t=0
$Z_v$=lowest line to be scanned
$Z_o$=uppermost line to be scanned
$P_0$=pixel of the point at the time t=0
$P_r$=pixel to be scanned farthest to the right
$P_1$=pixel to be scanned farthest to the left
$Z_v = Z_o - Const_1$
$Z_o = Z_v + Const_1$
$P_1 = P_o + Const_2$
$P_r = P_0 + Const_2$ with $Const_1$=maximum movement of the eye in y-direction, indicated in the plurality of lines with $Const_2$=maximum movement of the eye in x-direction, indicated in the plurality of lines.

The starting point of the scanning thus lies at $(P_1, Z_o)$. By addition of respectively one pixel, the point $(P_r, Z_0)$ is reached after $2*Const_2$ steps. By addition of $128-2*Const_2$ to the address of the point $(P_0 Z_0)$, the procedure starts anew one line lower. When the point $(P_v Z_v)$ is reached, the entire, relevant image region has been processed. If no point that coincides with the anticipated result has been found at this location, the region of the scanning can be temporarily enlarged. The plurality of pixels to be processed derives from the equation $$\text{Plurality} = 2*Const_1 + 2*Const_1.$$

Since the maximum movement in the time t (time for acquisition of the image signals) is very small, the relevant image region can be easily reduced by the factor 10 in relationship to the overall image. More calculating power can be allocated to the shaped comparison as a result of this measure. Since the camera 7, for example, is always located in the same position relative to the head, the image of the characteristic region 8 on the camera 7 is exactly defined, particularly when this is a matter of a predetermined reflector having a known size and shape. The differentiation data selected by a threshold can thus be simply compared to data of the characteristic region 8 or, respectively, of the reflector stored in an internal memory of the apparatus. Potential reflections that are caused by the infrared semiconductor diode are true-to-position and can thus be left out of consideration.

If a noise influence has, by chance the same shape as the stored shape in the memory, it still must be distinguished from the real point (location of the characteristic region 8). To accomplish this, only the position change of the points (FIG. 4) at the time t=0 and t=x can then be used. Since the two points can vary in position only with a finite speed, the point that lies closer to the prior point is probably the correct one.

When the characteristic region 8 is formed by the pupil, then a great number of different patterns can derive due to the size and dependent on the resolution of the camera 7. i.e., the pupil can differ greatly in the registration by the camera 7 in view of its image on the camera 7, the size and the position. Due to the differentiation of the difference image signals obtained from the subtraction, the data reduction that ensues in this situation then yields only a small amount of differentiation data that, however, have strong relevance and that are available for further interpretation. Thus, the edge of the pupil can be identified by forming a gradient from the differentiation data in x-direction and y-direction dependent on a prescribable limit. Moreover, a center of gravity calculation can be implemented in which the sum of all x-components is calculated and the sum of all y-components is calculated. The center of gravity that is thus identified then lies in the region of the center of the pupil and can thus be utilized for the identification of the location coordinates.

Figure 6:
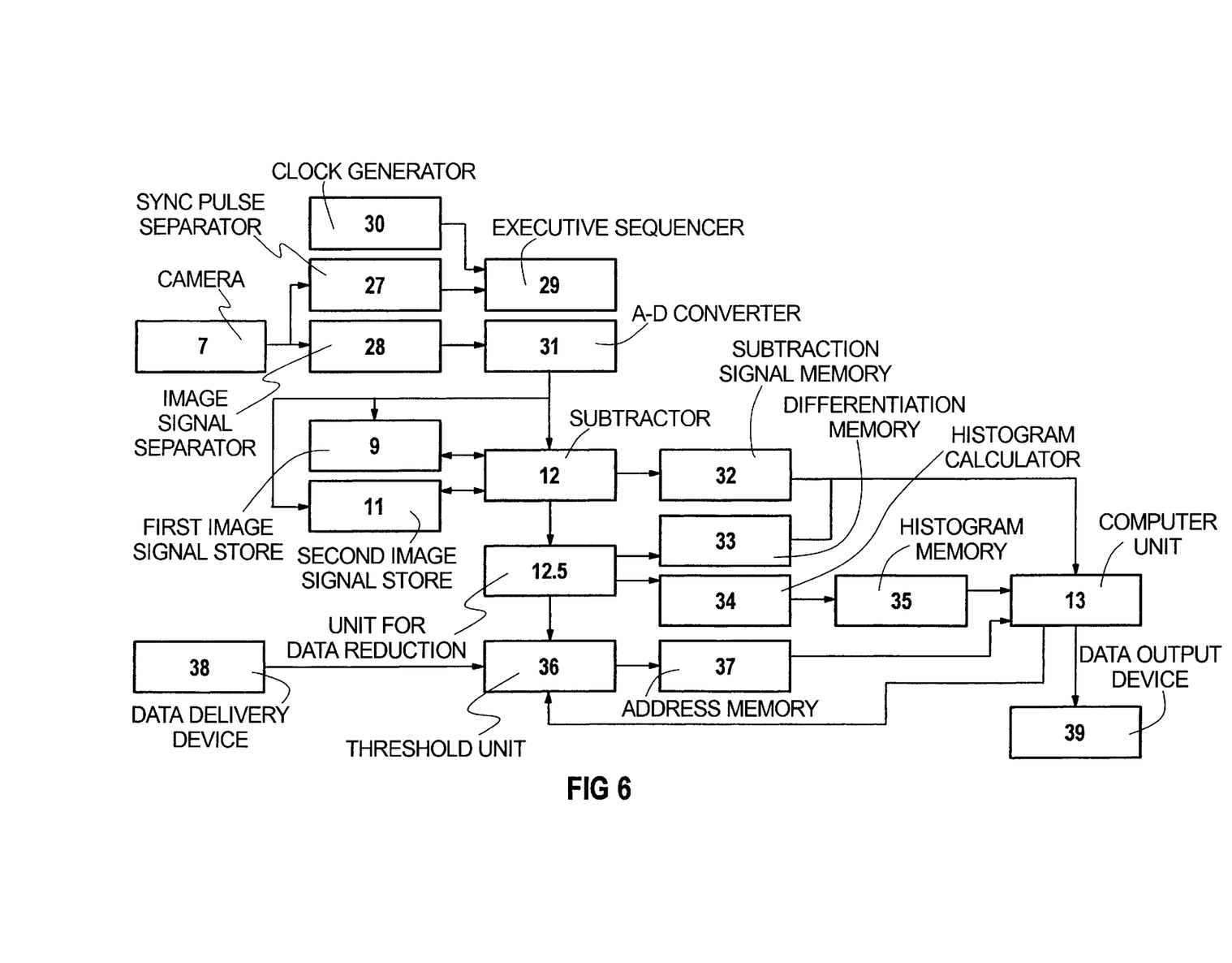
FIG. 6 a more detailed circuit arrangement of the apparatus of the invention.

A more detailed explanation of an inventive apparatus, is shown in FIG. 6 in which the elements already cited above are identified with the same reference characters. The BAS signals of the camera 7, which cover the image signals as well as the synchronization pulses (line and image synchronization pulses), are subsequently supplied to a sync pulse separator 27 and to a an image signal separator 28. The synchronization pulses are separated from the BAS signal in the sync pulse separator 27. In the image signal separator 28, the image signals are separated from the synchronization pulses and are amplified. The synchronization pulses separated in the sync pulse separtor 27 as well as the signals of a clock generator 30 are supplied to an executive sequencer 29. On the basis of these signals, the executive sequencer 29 generates all control signals necessary for the function sequence. A second unit is composed of an analog-to-digital converter 31 to which the amplified image signals of the image signal separator 28 are supplied and that, for example, works with a sampling frequency such that the image signals are digitalized with, for example, approximately 500 pixels per line. As explained above, these image signals—controlled by the executive sequencer 29—are alternately written into the first and second image signal store 9, 11, resulting in the other store containing the image signals of the prior image. Since both image signal stores 9, 11 receive their address via the same address bus, the pixel brightness of a pixel is present as a digital word (8 bits) from the current and from the previous image at every point in time. The subtraction of the digital information of the image signals stored in the image signal stores 9, 11 ensues in the subtractor 12, which is preferably implemented by programmable logic. Difference image signals that are cleaned as much as possible of reflections and other noise influences thus proceed from the subtractor 12. The difference image signals proceeding from the subtractor 12 are supplied both to a following subtraction signal memory 32 as well as to the unit for data reduction 12.5. The differentiation of the difference image signals generated by the subtractor 12 ensues in this unit for data reduction 12.5, whereby successive pixels are differentiated from one another, and identifies the contrast between these pixels. The results of this differentiation are respectively stored as a digital word in a differentiation memory 33, being stored as differentiation data. Since, however, it not clear from the outset in the differentiation whether the value of a first digital word is lower than that of the second or vice versa, both results (A–B; B–A) are formed, and the correct operation sign is identified by a comparator working in parallel. Since, for example, only 7 bits are used in the differentiation because such great contrasts are hardly to be anticipated, the eighth bit is used as an operational sign bit. Whether the signal value of the pixel is higher or lower, i.e., the image becomes brighter or darker, can thus be identified quickly. This information is extremely important in order to decide the edge of the characteristic region 8 or, respectively, of the pupil at which one is located in the evaluation. During the differentiation, a histogram of the differentiation data is formed in a following histogram calculator 32, i.e. the frequency of the individual, possible contrasts of the image is identified. A threshold can be calculated on the basis of the frequency of the various contrasts contained in the image. To accomplish this, the 7 bits of the respective differentiation data are used as an address for, for example, a 7×11 bit histogram memory 35. The operational sign bit that indicates whether the brightness increases or decreases need not be taken into consideration here.

In a threshold unit 36 following the unit for data reduction 12.5, the differentiation data are evaluated to see whether, according to the exemplary embodiment, they exceed a predetermined threshold. When they exceed a predetermined threshold, then the respective address is written into a following address memory 37. Within the framework of the invention, however, the evaluation of the differentiation data can also result in a check carried out to see whether the differentiation data fall below a predetermined threshold. The computer unit 13 then only interprets the data of the histogram memory 35 whose addresses it receives from the address memory 37, considerably reducing the amount of data to be processed has thus be considerably reduced. From the data that can be read from the histogram memory 35, the computer unit 13 can also calculate the threshold above which the highest contrasts lie. This threshold is then input into the threshold unit 36.

The computer unit 13, however, can also still access the data stored in the subtraction memory 32 and the data stored in the differentiation memory 33, so that a check can be carried out to see whether the detected pupil is really black in the center. A check can be carried out based on the data of the differentiation memory 33 to see whether the eighth (operation sign) bit is positive or negative, as a result by which one can determine the edge of the characteristic region 8 at which one is located in the interpretation.

A data delivery device (for example, from a PC) is identified with reference character 38, and a data output device (for example into a PC) is identified with reference character 39.

The above-described method is illustrative of the principles of the present invention. Numerous modifications and adaptions thereof will be readily apparent to those skilled in this art without departing from the spirit and scope of the present invention.

What is claimed is:

1. A method for operating a device for acquiring the location of a characteristic region of a person comprising the steps of:

generating first and second image signals of said characteristic region with a camera, including generating said first image signals with a first light source, and generating said second image signals with said first light source and a second light source having a light emission different from said first light source, subtracting said first and second image signals for generating difference image signals, analyzing said difference image signals in view of signals generated by said characteristic region and thereby determining location coordinates of said characteristic region;

generating a signal dependent on said location coordinates;

wherein said step of generating first and second image signals further comprises the steps of:
  reading out a defined fraction of lines of said camera, and
  supplying line signals of said lines to stores.

2. A method according to claim 1, wherein:
said characteristic region is the pupil of the eye of said person.

3. A method for operating a device for acquiring the location of a characteristic region of a person comprising the steps of:
  a) generating first and second image signals of said characteristic region with a camera, including generating said first image signals with a first light source, and generating said second image signals with said first light source and a second light source having a light emission different from said first light source,
  b) subtracting said first and second image signals for generating difference image signals,
  c) analyzing said difference image signals in view of signals generated by said characteristic region and thereby determining location coordinates of said the characteristic region;
  d) generating a signal dependent on said location coordinates; and
  repeating steps (a)–(d) after performing steps (a)–(d), wherein said repeated step of analyzing said difference signals is limited to a predetermined area that is dependent on said current location coordinates calculated in the initial said step of analyzing said difference signals of said characteristic region.

4. A method according to claim 3, further comprising the step of:
  enlarging said predetermined area when no signals emanating from said characteristic region can be found.

5. A method according to claim 3, further comprising the step of:
  continuously repeating said repeated steps (a)–(d).

6. A method for operating a device for acquiring the location of a characteristic region of a person comprising the steps of:
  generating first and second image signals of said characteristic region with a camera, including generating said first image signals with a first light source, and generating said second image signals with said first light source and a second light source having a light emission different from said first light source,
  subtracting said first and second image signals for generating difference image signals,
  analyzing said difference image signals in view of signals generated by said characteristic region and thereby determining location coordinates of said characteristic region;
  generating a signal dependent on said location coordinates;
  said characteristic region being a reflective surface that is connected to said person; and
  said reflective surface being arranged on a contact lens.

7. A method for operating a device for acquiring the location of a characteristic region of a person comprising the steps of:
  generating first and second image signals of said characteristic region with a camera, including generating said first image signals with a first light source, and generating said second image signals with said first light source and a second light source having a light emission different from said first light source,
  subtracting said first and second image signals for generating difference image signals,
  analyzing said difference image signals in view of signals generated by said characteristic region and thereby determining location coordinates of said characteristic region;
  generating a signal dependent on said location coordinates; and
  evaluating said control signals by said computer in view of the movement of said characteristic region considering a factor selected from the group consisting of: speed, location, movement distance, movement distances, and time behavior;
  said device being a computer.

8. A method for operating a device for acquiring the location of a characteristic region of a person comprising the steps of:
  generating first and second image signals of said characteristic region with a camera, including generating said first image signals with a first light source, and generating said second image signals with said first light source and a second light source having a light emission different from said first light source,
  subtracting said first and second image signals for generating difference image signals,
  analyzing said difference image signals in view of signals generated by said characteristic region and thereby determining location coordinates of said characteristic region;
  generating a signal dependent on said location coordinates; and
  controlling a marking on a display via said control signal.

9. An apparatus for acquiring the location of a characteristic region of a person and for generating a control signal for a device dependent on this location, comprising:
  an image signal generator for generating first and second image signals of said characteristic region with a camera,
  a first light source utilized in producing said first image signal,
  a second light source having a light emission different from said first light source and utilized in producing said second image signal,
  a subtractor for subtracting said first and said second image signals for generating difference image signals,
  an analyzer for analyzing said difference image signals in view of said signals generated by said characteristic region,
  a characteristic region coordinate locator for determining said location coordinates of said characteristic region,
  a location coordinate generator for generating a signal dependent on said location coordinates,
  a first and a second store for respectively storing said first and second image signals, wherein said subtractor follows said stores for forming said difference image signals from said signals of the stores,
  a computer unit following said subtractor for calculating said location coordinates of said characteristic region from said difference image signals,
  a unit for data reduction which follows said subtractor for pixel-by-pixel differentiation of said difference image signals of said subtractor and for generating differentiation data, a threshold unit for comparing said respective differentiation data to a predetermined limit which follows said unit for data reduction, an address memory for storing an addresses of said differentiation data that upwardly or downwardly exceed said predetermined limit which follows said unit for data reduction, and wherein said computer unit determines said location coordinates on the basis of said addresses stored in said address memory.

10. An apparatus according to claim 9, further comprising:

a histogram calculator for generating histogram data from said differentiation data, a histogram memory for storing said histogram data from said differentiation data and, wherein said computer unit determines said location coordinates on the basis of said data of said address memory and said data of said histogram memory.

11. An apparatus according to claim 9, wherein said computer unit calculates said predetermined limit on the basis of said data of said histogram memory.

12. An apparatus for acquiring the location of a characteristic region of a person and for generating a control signal for a device dependent on this location, comprising:

an image signal generator for generating first and second image signals of said characteristic region with a camera, a first light source utilized in producing said first image signal, a second light source having a light emission different from said first light source and utilized in producing said second image signal, a subtractor for subtracting said first and said second image signals for generating difference image signals, wherein said subtractor is a part of a programmable logic device, an analyzer for analyzing said difference image signals in view of said signals generated by said characteristic region, a characteristic region coordinate locator for determining said location coordinates of said characteristic region, a location coordinate generator for generating a signal dependent on said location coordinates, a first and a second store for respectively storing said first and second image signals, wherein said subtractor follows said stores for forming said difference image signals from said signals of the stores, and a computer unit following said subtractor for calculating said location coordinates of said characteristic region from said difference image signals.

13. An apparatus according to claim 9, wherein:

said unit for data reduction is a part of a programmable logic device.

14. An apparatus according to claim 13, wherein:

said programmable logic device comprises a component selected from the group consisting of a GAL component and a FPGA component.

15. An apparatus according to claim 12, wherein:

said programmable logic device comprises a component selected from the group consisting of a GAL component and a FPGA component.

* * * * *